(12) United States Patent
Stein

(10) Patent No.: US 10,442,344 B2
(45) Date of Patent: Oct. 15, 2019

(54) SYSTEM FOR AND METHOD OF INSTALLING AN EXTERIOR-MOUNTED LIGHT BAR UNDERNEATH A FACTORY-INSTALLED REAR SPOILER ON A VEHICLE LIFTGATE

(71) Applicant: Code 3, Inc., St. Louis, MO (US)

(72) Inventor: Paul L. Stein, O'Fallon, MO (US)

(73) Assignee: Code 3, Inc., St. Louis, MO (US)

( * ) Notice: Subject to any disclaimer, the term of this patent is extended or adjusted under 35 U.S.C. 154(b) by 0 days.

(21) Appl. No.: 16/150,072

(22) Filed: Oct. 2, 2018

(65) Prior Publication Data

US 2019/0118704 A1 Apr. 25, 2019

Related U.S. Application Data

(60) Provisional application No. 62/574,614, filed on Oct. 19, 2017.

(51) Int. Cl.
*B60Q 1/26* (2006.01)
*B60Q 1/00* (2006.01)
*H01B 7/00* (2006.01)

(52) U.S. Cl.
CPC ......... *B60Q 1/2615* (2013.01); *B60Q 1/0035* (2013.01); *B60Q 1/2611* (2013.01); *H01B 7/0045* (2013.01)

(58) Field of Classification Search
CPC ........ B60Q 1/2611; B60Q 1/302; B60Q 1/52; B60Q 1/0483; B60Q 1/24; B60Q 1/2661; B60Q 2900/10
USPC .................................................. 362/459–549
See application file for complete search history.

(56) References Cited

U.S. PATENT DOCUMENTS

| | | | |
|---|---|---|---|
| 7,589,622 B2 * | 9/2009 | Farley .................. | B60Q 1/2615 362/506 |
| 2006/0203504 A1 * | 9/2006 | Mori .................... | B60Q 1/2615 362/541 |
| 2013/0077336 A1 * | 3/2013 | Helterbrand ......... | B60Q 1/2611 362/541 |

* cited by examiner

*Primary Examiner* — William J Carter
(74) *Attorney, Agent, or Firm* — Stoel Rives LLP; Robert R. Teel

(57) ABSTRACT

Disclosed are techniques for installing an exterior-mounted light bar accessory underneath a factory-installed rear spoiler on a liftgate of a vehicle while leaving intact the rear spoiler and a liftgate spoiler sealing system fitted and mounting components used during factory installation of the rear spoiler by attachment to the liftgate, the liftgate having a top side margin and the vehicle having a roof with a rear end, the rear spoiler mounted at the top side margin of the liftgate and at the rear end of the roof, and the liftgate having an outer surface with first and second curved distal ends.

12 Claims, 16 Drawing Sheets

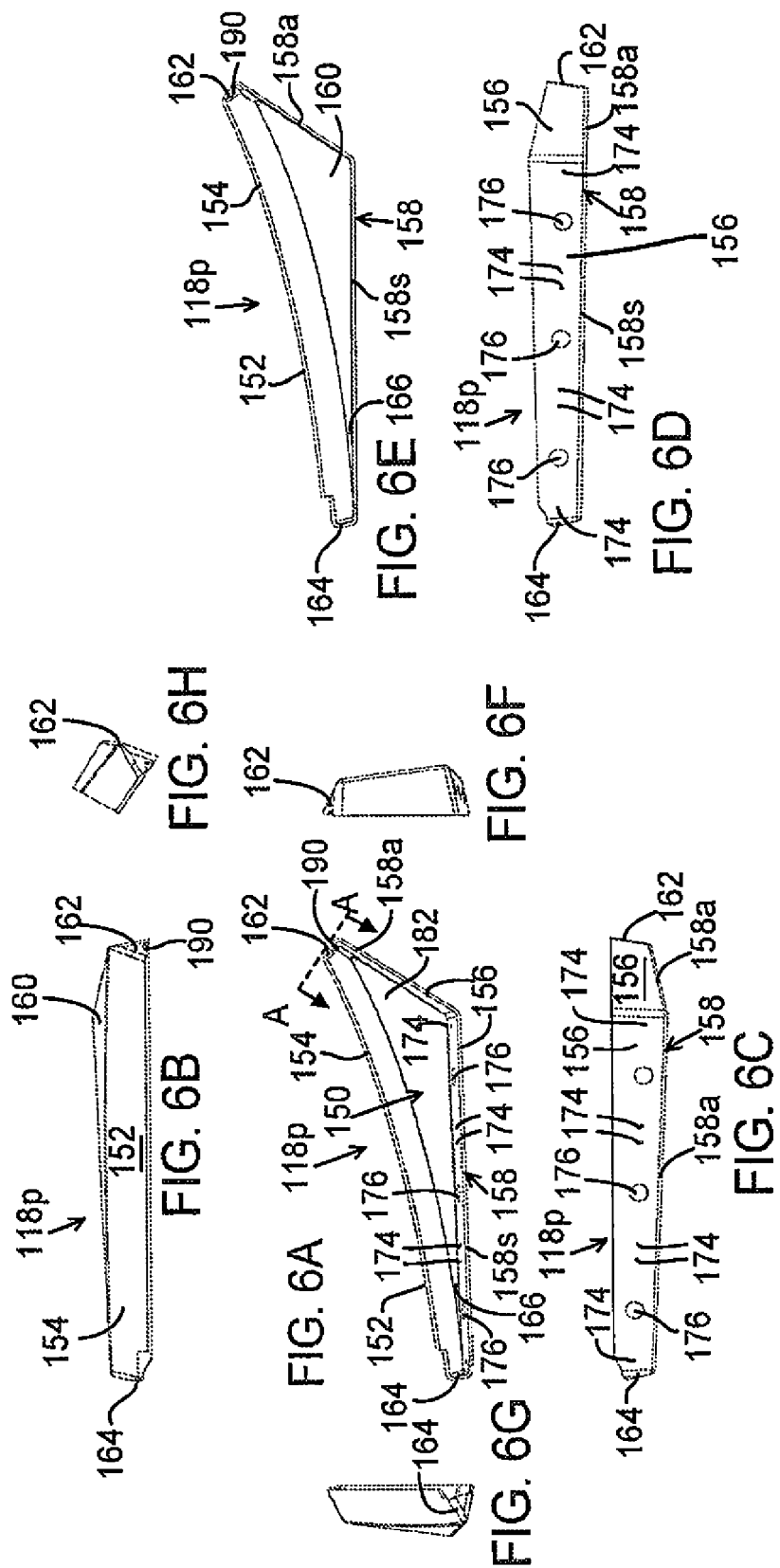

SYSTEM FOR AND METHOD OF INSTALLING AN EXTERIOR-MOUNTED LIGHT BAR UNDERNEATH A FACTORY-INSTALLED REAR SPOILER ON A VEHICLE LIFTGATE

RELATED APPLICATION

This application claims priority benefit of U.S. Provisional Patent Application No. 62/574,614, filed Oct. 19, 2017, which is hereby incorporated by reference.

COPYRIGHT NOTICE

©2018 Code 3, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

The present disclosure relates to exterior lighting units installed underneath the rear spoiler of a vehicle and, in particular, to a system for and method of installing a light bar underneath a factory-installed rear spoiler and against the outer surface of a liftgate of a vehicle without removal and later reinstallation of the rear spoiler.

BACKGROUND INFORMATION

FIG. 1 is a fragmentary perspective view of the rear end of a utility vehicle 10 having a liftgate 12 to which a factory-installed rear spoiler 14 is attached. A window panel 16 is fitted to and thereby forms an upper portion of liftgate 12. An exterior lighting unit in the form of a two-housing light bar 18 is installed underneath rear spoiler 14 and positioned adjacent an outer surface 20 of window panel 16. Light bar 18 includes a passenger side light housing 18p and a driver side light housing 18d. Three light heads 22 are attached to each of light housings 18p and 18d. The positioning of light bar 18 underneath rear spoiler 14 provides the vehicle driver maximum rear window visibility and eliminates a possibility of vehicle interior backflash.

U.S. Pat. No. 8,899,805 of Helterbrand et al. describes a conventional technique for mounting a light bar assembly, such as light bar 18, to a liftgate of a utility vehicle. Helterbrand et al. describes a light bar support formed with openings corresponding to locations of preexisting openings in the vehicle and mounting fasteners that can be used to attach the light bar support to the vehicle so that no other openings or alterations are required.

Helterbrand et al. states that the light bar support allows the light bar assembly to be readily mounted on the vehicle without modifications to the vehicle or the light bar assembly. The Helterbrand et al. method of mounting the light bar assembly to the liftgate on the vehicle entails removing the rear spoiler from the liftgate to set the light bar support in place between the rear spoiler and the liftgate, and thereafter passing the mounting fasteners, such as mount bolts, for the spoiler through the preexisting openings in the liftgate to secure the rear spoiler and light bar assembly to the liftgate.

FIG. 2A is an exploded view of rear spoiler 14 detached from a top side margin 24 of liftgate 12. FIGS. 2B, 2C, and 2D are pictorial views of the interior of rear spoiler 14, showing the locations of sealing gaskets 30, plastic spoiler retention clips 32, and point nuts 34 used to effect secure mating of rear spoiler 14 to liftgate 12. The light bar assembly mounting technique of Helterbrand et al. requires removal of rear spoiler 14 from the top of liftgate 12 and later reinstallation of rear spoiler 14 onto the top of liftgate 12. The rear spoiler removal and reinstallation process creates a potential for breakage of plastic spoiler retention clips 32, dislodgement of or damage to sealing gaskets 30, or loss of point nuts 34 or their associated mounting bolts. An upfitter installing the light bar assembly and faced with broken or loss of some of the mounting components may choose to reinstall rear spoiler 14 to liftgate 12 with fewer than the original number of or damaged mounting components used by factory installers. One or both of use of fewer than the factory-specified number of mounting components and use of damaged sealing gaskets would result in improper rear spoiler reinstallation and adverse consequences stemming from it.

What is needed is a system for and a method of installing an exterior-mounted light bar underneath a factory-installed rear spoiler on a vehicle liftgate that necessitates no disassembly, and thereby leaves intact the original mounting components, of the rear spoiler and the factory-installed liftgate spoiler sealing system.

SUMMARY OF THE DISCLOSURE

Disclosed are systems for and methods of installing an exterior-mounted light bar accessory underneath a factory-installed rear spoiler on a liftgate of a vehicle while leaving intact the rear spoiler and a liftgate spoiler sealing system fitted and mounting components used during factory installation of the rear spoiler by attachment to the liftgate, the liftgate having a top side margin and the vehicle having a roof with a rear end, the rear spoiler mounted at the top side margin of the liftgate and at the rear end of the roof, and the liftgate having an outer surface with first and second curved distal ends.

According to some embodiments, a light bar housing is obtained for installation underneath the rear spoiler and against the outer surface of the liftgate, the light bar housing configured for attachment of multiple light heads and including a liftgate mounting surface and a light head mounting surface, the liftgate mounting surface of the light bar housing having a curved distal end portion of complementary shape to the curved outer surface at one of the first and second curved distal ends of the outer surface of the liftgate. The light bar housing is positioned underneath the rear spoiler and against the outer surface of the liftgate, the liftgate mounting surface of the light bar housing set in alignment with one of the first and second curved distal ends of the outer surface of the liftgate. Bonding material is used to securely mount the light bar housing, while set in its alignment position, to the outer surface of the liftgate, thereby leaving intact the factory-installed rear spoiler and its mounting components and sealing system throughout the installation of the light bar housing.

Additional aspects and advantages will be apparent from the following detailed description of embodiments, which proceeds with reference to the accompanying drawings.

BRIEF DESCRIPTION OF THE DRAWINGS

FIGS. 6A, 6B, and 6C are, respectively, a top plan view showing an interior cavity, a side elevation view showing a liftgate mounting surface of a bowed wall, and a side elevation view showing a light head mounting surface of a two-section wall of the light bar housing.

FIGS. 6D and 6E are, respectively, a side elevation view showing a light head mounting surface and a bottom plan view showing a bottom floor of a light bar housing.

FIG. 6F is an end view of a junction of the distal ends of a bowed wall and the two-section wall of the light bar housing.

FIG. 6G is an end view of a junction of the medial ends of the bowed wall and the two-section wall of the light bar housing.

FIG. 6H is a section view taken along lines A-A of FIG. 6A at a junction of the distal ends of the bowed wall and the two-section wall.

DETAILED DESCRIPTION OF EMBODIMENTS

Figure 1:
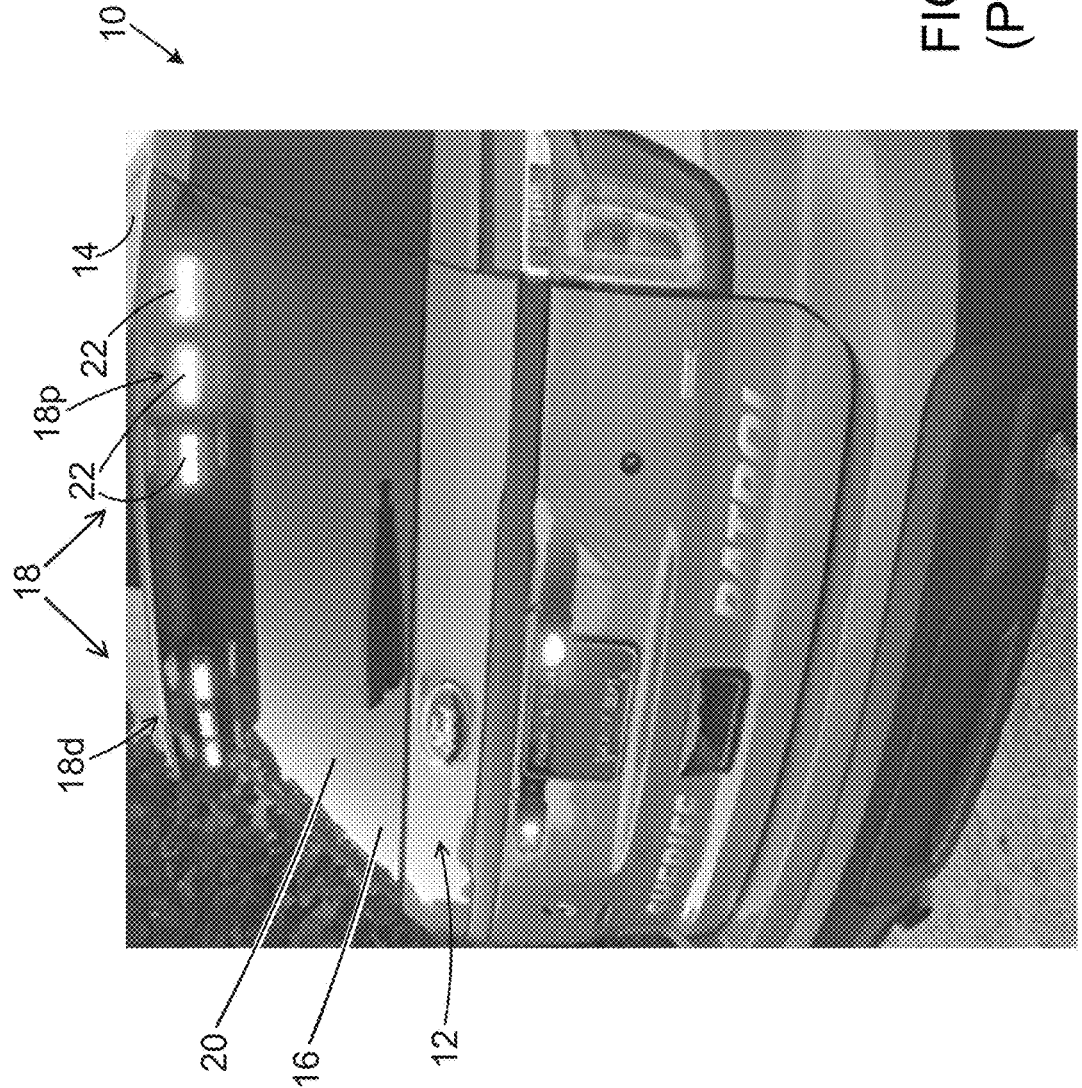
FIG. 1 is a fragmentary perspective view of the rear end of a utility vehicle having a liftgate to which a factory-installed rear spoiler is attached.
Figure 2A:
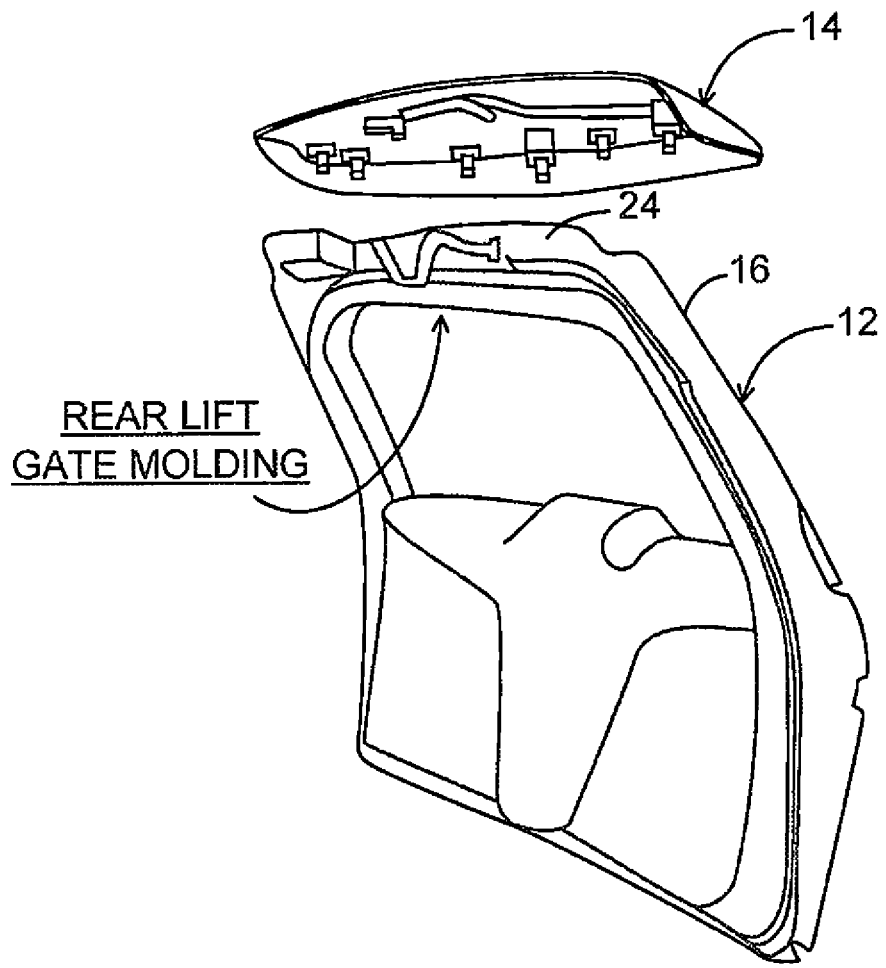
FIG. 2A is an exploded view of the rear spoiler detached from a top side margin of the liftgate.
Figure 2B:
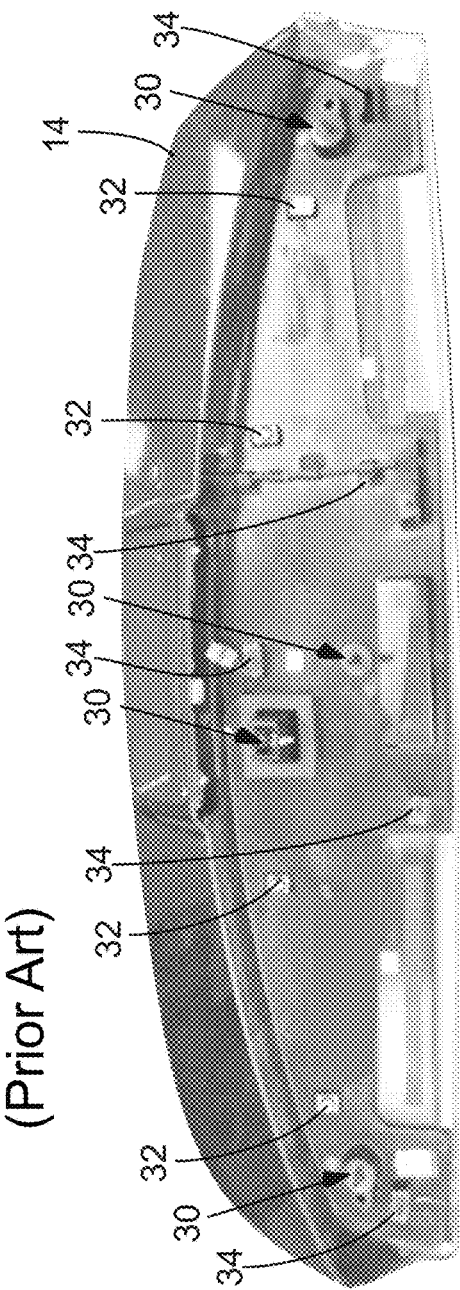
FIG. 2B is a pictorial view of the interior of the rear spoiler, showing the locations of sealing gaskets, plastic spoiler retention clips, and point nuts used to effect secure mating of the rear spoiler to the liftgate.
Figure 2C:
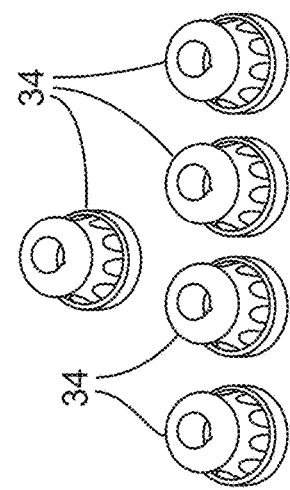
FIGS. 2C and 2D are enlarged pictorial views of, respectively, a plastic spoiler retention clip and five point nuts shown in FIG. 2B.
Figure 2D:
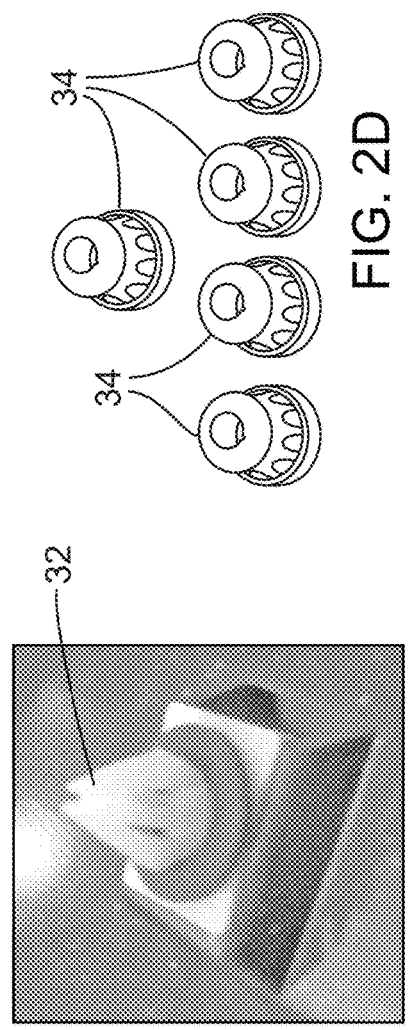
Figure 3:
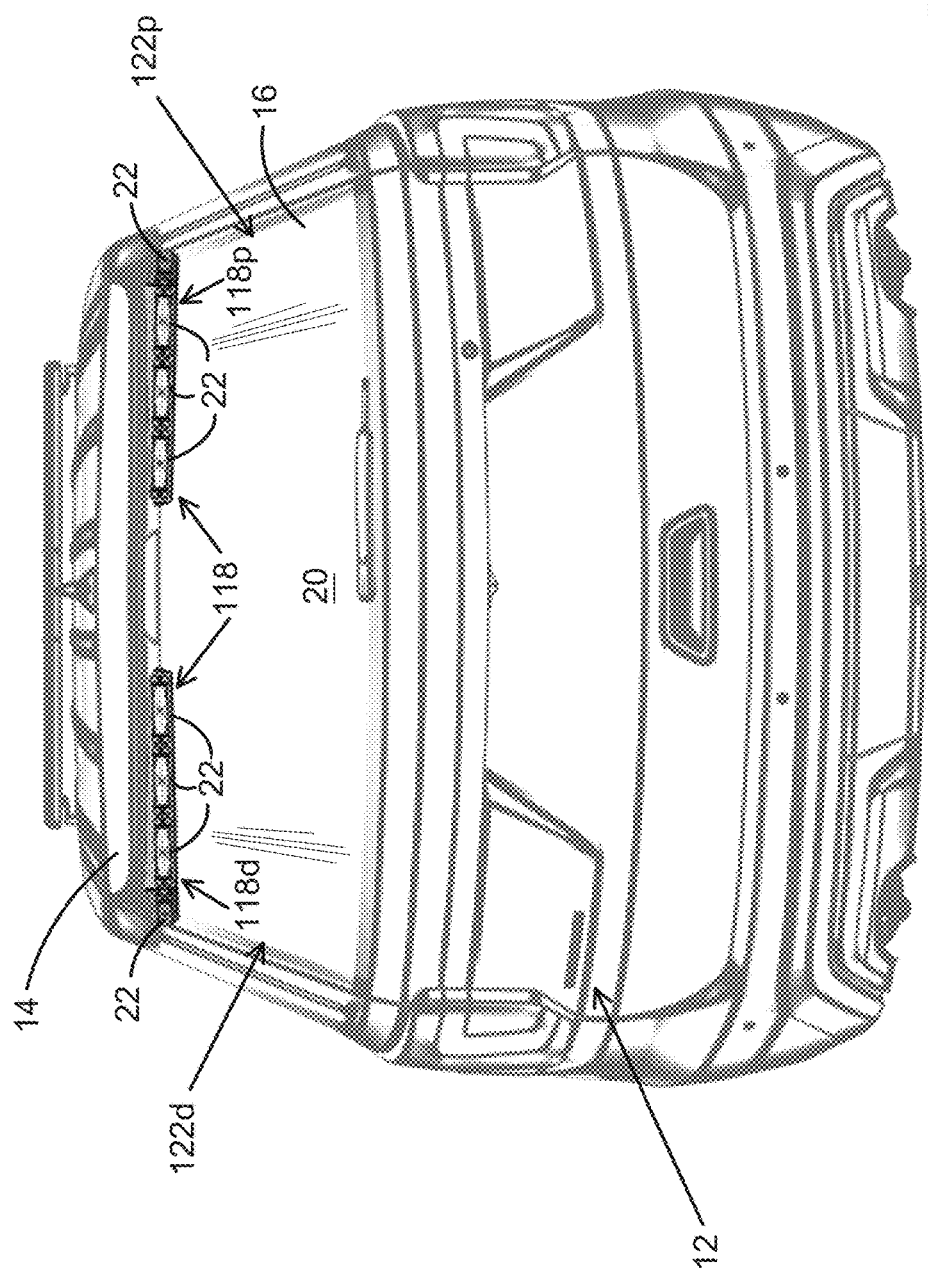
FIGS. 3 and 4 are, respectively, a rear end view and a fragmentary perspective view of a two-housing light bar that is positioned underneath the spoiler and is mounted to the outer surface of a window panel forming a portion of the liftgate of the vehicle.
Figure 4:
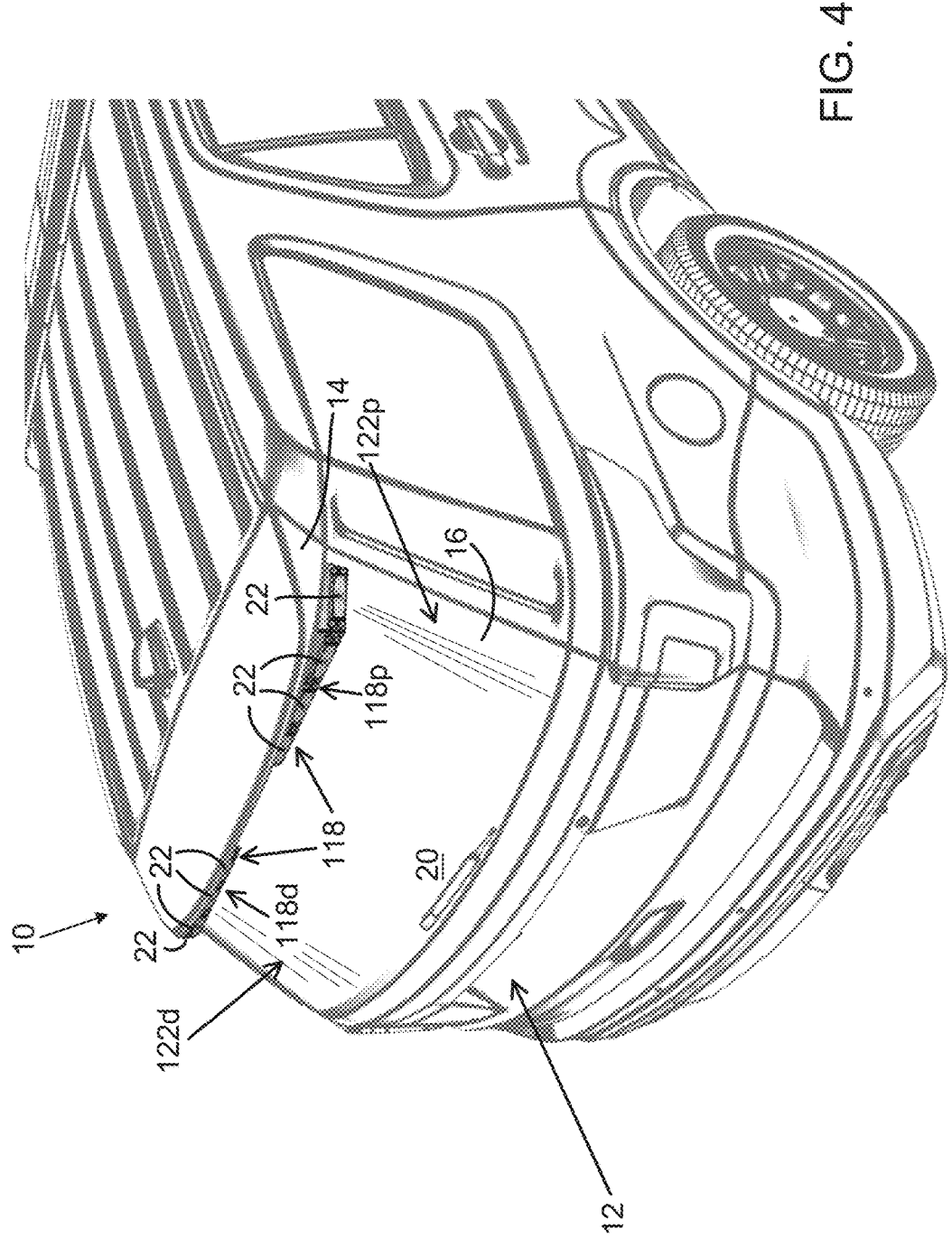

FIGS. 3 and 4 are, respectively, a rear end view and a fragmentary perspective view of a two-housing light bar 118 that is positioned underneath spoiler 14 and is mounted to outer surface 20 of window panel 16 forming a portion of liftgate 12 of vehicle 10. Light bar 118 includes a first or passenger side light bar housing 118p and a second or driver side light bar housing 118d. Light bar housings 118p and 188d are preferably vacuum-formed plastic parts. Multiple light heads 22 are attached to each of light bar housings 118p and 118d. (Four light heads 22 attached to each of light bar housings 118p and 118d are shown in FIGS. 3 and 4, but more or fewer light heads 22 may be used in other embodiments.)

Figure 5A:
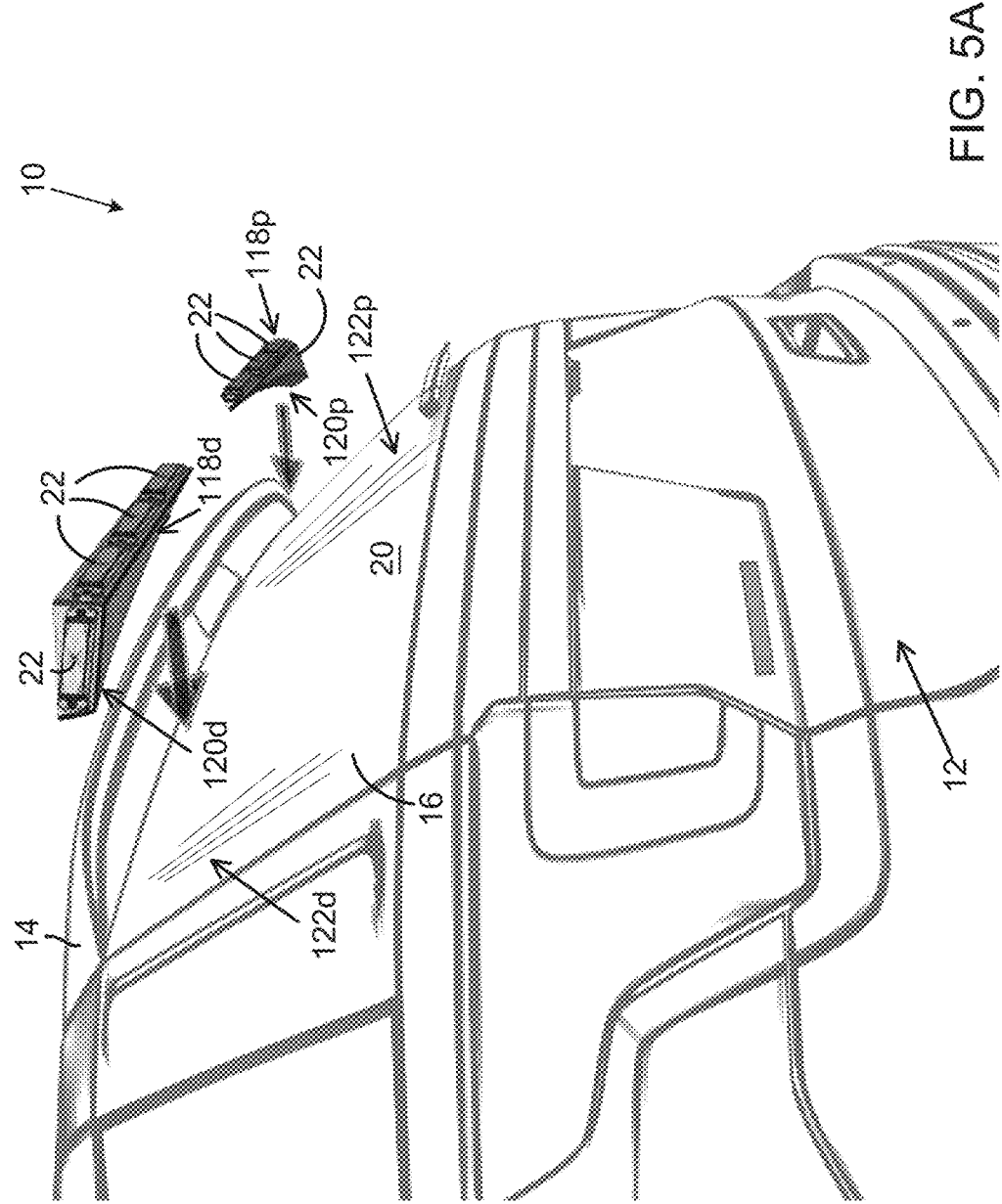
FIGS. 5A and 5B, respectively, are a fragmentary perspective view and a fragmentary driver side elevation view of the vehicle, showing the positioning of light bar housings and underneath the spoiler during installation.
Figure 5B:
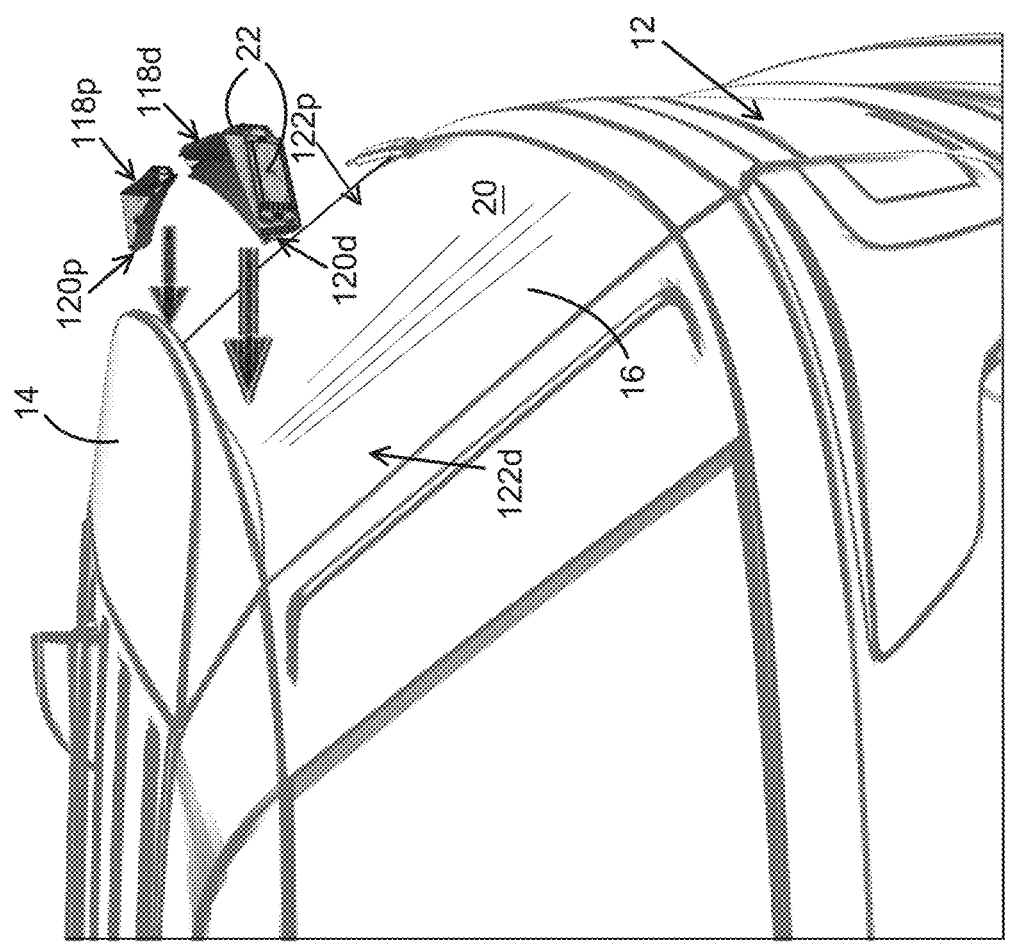

FIGS. 5A and 5B, respectively, are a fragmentary perspective view and a fragmentary driver side elevation view of vehicle 10, showing the positioning of light bar housings 118p and 118d underneath spoiler 14 during installation.

FIGS. 5A and 5B show that light bar housings 118p and 118d have respective curved distal end portions 120p and 120d. Distal end portions 120p and 120d are of complementary shapes to, and thereby align with, the curved surfaces of respective distal ends 122p and 122d of outer surface 20 of window panel 16 when light bar housings 118p and 118d are installed. The following detailed description is directed to the configuration of light bar housing 118p but applies to both of light bar housings 118p and 118d because they are handed, i.e., light bar housing 118d is the mirror image of light bar housing 118p.

FIGS. 6A, 6B, and 6C are, respectively, a top plan view showing an interior cavity 150, a side elevation view showing a liftgate mounting surface 152 of a bowed wall 154, and a side elevation view showing a light head mounting surface 156 of a two-section wall 158 of light bar housing 118p. FIGS. 6B and 6C are depicted with reference to FIG. 6A.

FIGS. 6D and 6E are, respectively, a side elevation view showing light head mounting surface 156 and a bottom plan view showing a bottom floor 160 of light bar housing 118p. FIG. 6D is the same as, but is rotated 180° in the plane of the figure relative to, FIG. 6C.

FIG. 6F is an end view of a junction 162 of the distal ends of bowed wall 154 and two-section wall 158 of light bar housing 118p. FIG. 6G is an end view of a junction 164 of the medial ends of bowed wall 154 and two-section wall 158 of light bar housing 118p. FIGS. 6F and 6G are depicted with reference to FIG. 6A.

FIG. 6H is a section view taken along lines A-A of FIG. 6A at junction 162 of the distal ends of bowed wall 154 and two-section wall 158.

FIGS. 6A, 6C, 6D, and 6E show light head mounting surface 156 of two-section wall 158 that includes a first or straight section 158s and a second or angled section 158a. Three light heads 22 are attached to straight section 158s, and one light head 22 is attached to angled section 158a. The light head 22 mounted on angle section 158a, which is angularly offset relative to the centerline of vehicle 10, provides warning for other vehicles approaching from the side or rear of vehicle 10. FIGS. 6A and 6E show a drain hole 166 in bottom floor 160 to provide a flow passage out of light bar housing 118p for water seeping into interior cavity 150 through the tight space between rear spoiler 14 and the open top of light bar housing 118p.

Figure 7:
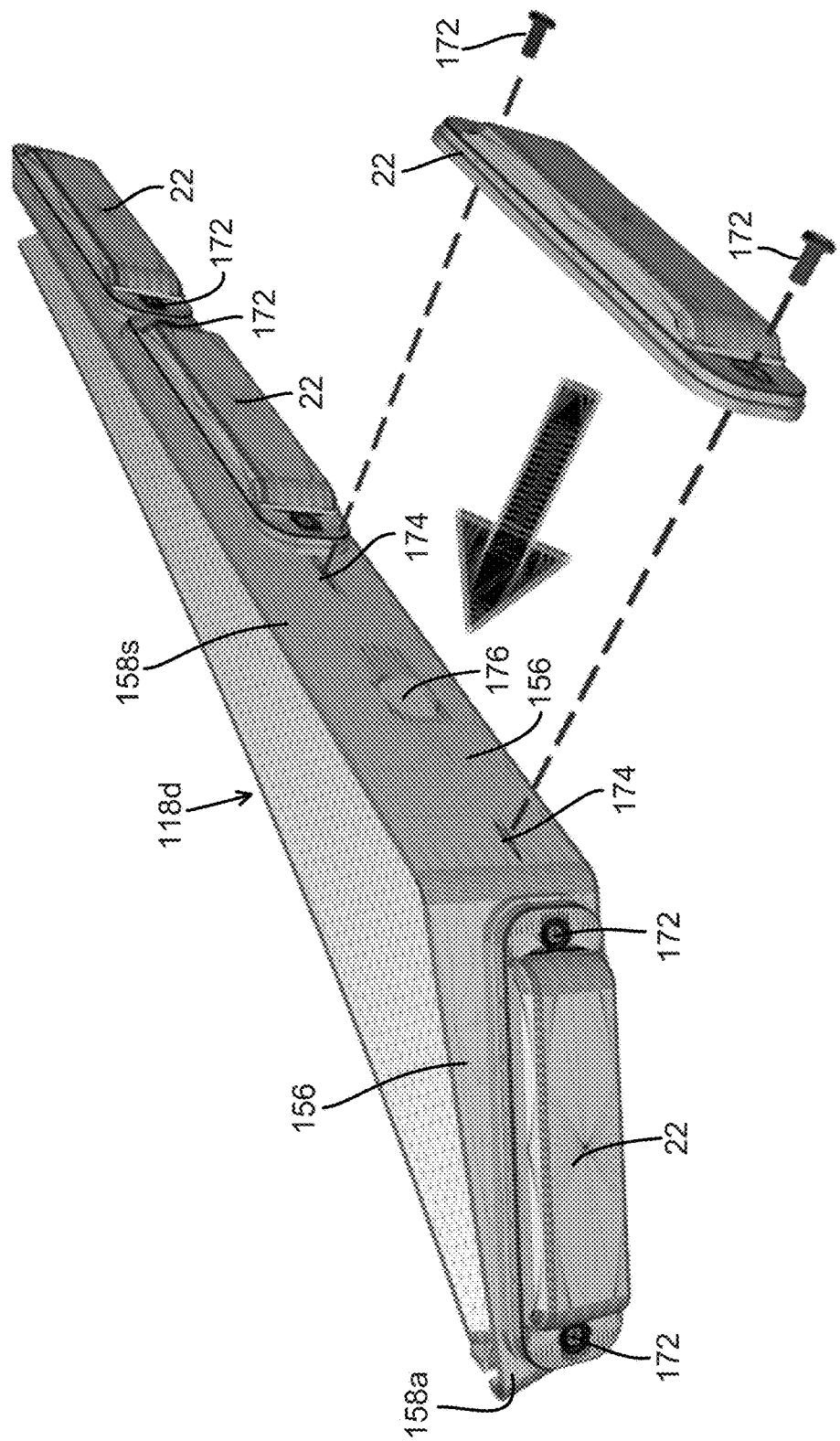
FIG. 7 is a perspective view of the light bar housing showing two screws attaching one light head to the light head mounting surface of a straight section of the two-section wall.

FIG. 7 is a perspective view of light bar housing 118d showing two screws 172 attaching one light head 22 to light head mounting surface 156 of straight section 158s of two-section wall 158. FIGS. 6A, 6C, 6D, and 7 show that mounting holes 174 in two-section wall 158 receive screws 172 and wiring apertures 176 receive wire bundles 178 (FIG. 9) extending from the four light heads 22.

Figure 8:
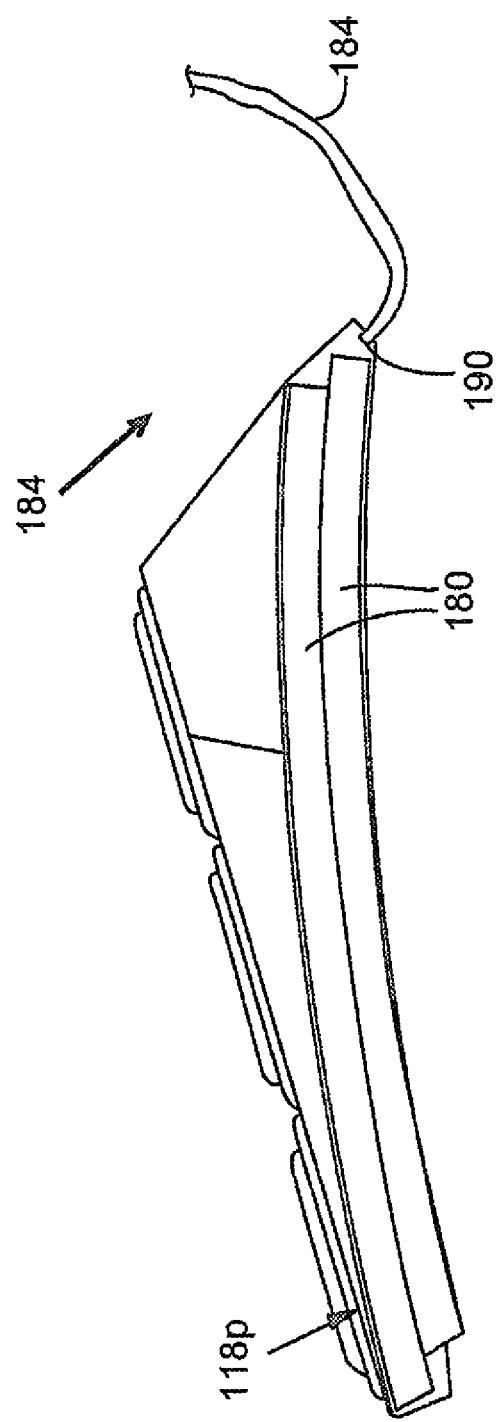
FIG. 8 is a perspective view of the passenger side light head housing, showing two strips of very high bond tape affixed to the liftgate mounting surface of the bowed wall.

FIG. 8 is a perspective view of light head housing 118p, showing two strips of very high bond tape 180 affixed to liftgate mounting surface 152 of bowed wall 154. Very high bond tape 180 is an example bonding material for establishing a high-strength bond of light head housing 118p to outer surface 20 of window panel 16. One suitable very high bond tape is 3M™ VHB™ Tape, which is a double-sided bonding tape that immediately bonds on contact.

Figure 9:
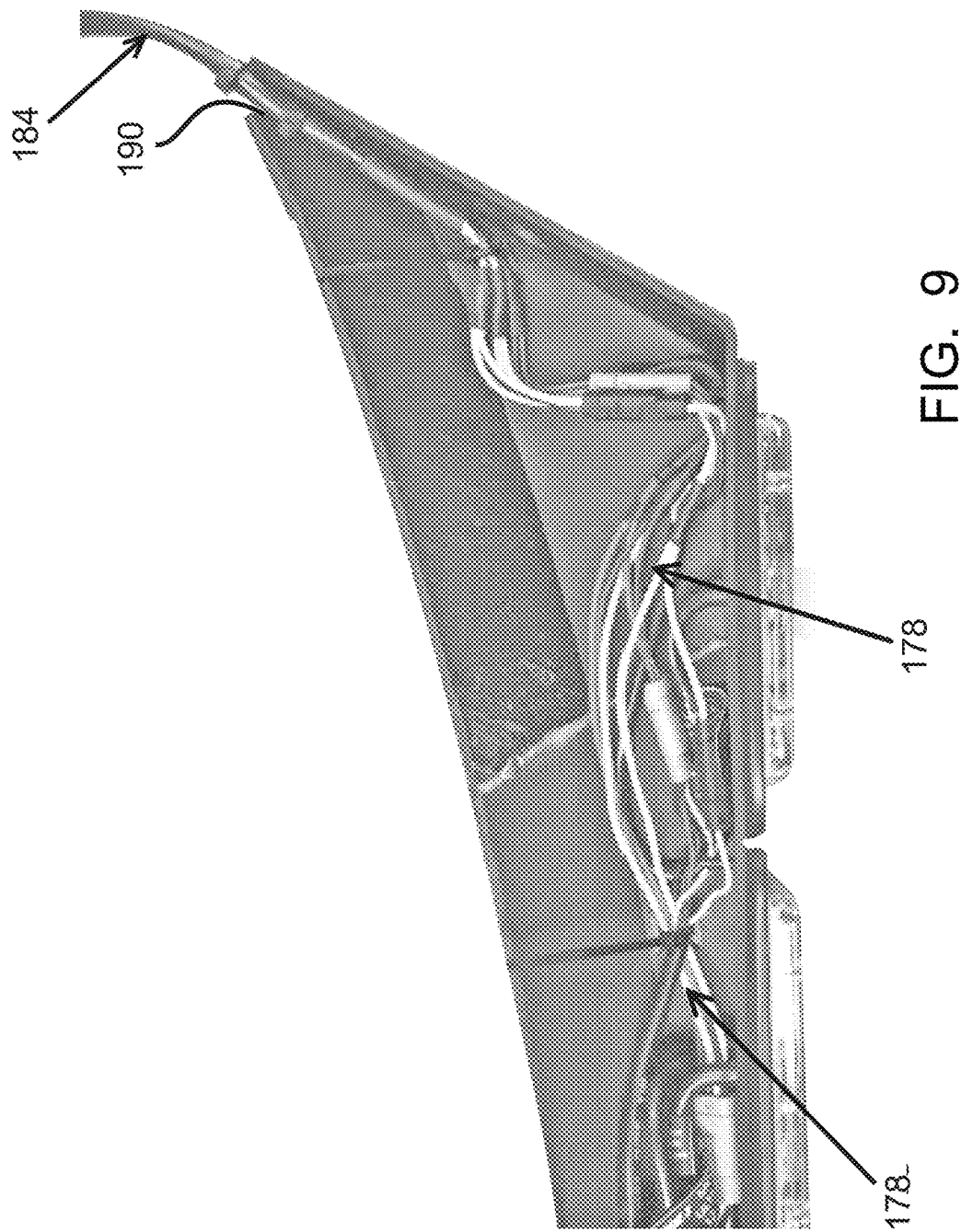
FIG. 9 is a pictorial view of wire bundles extending from light heads and lying on a bottom floor surface in interior cavity of the light bar housing.
Figure 10:
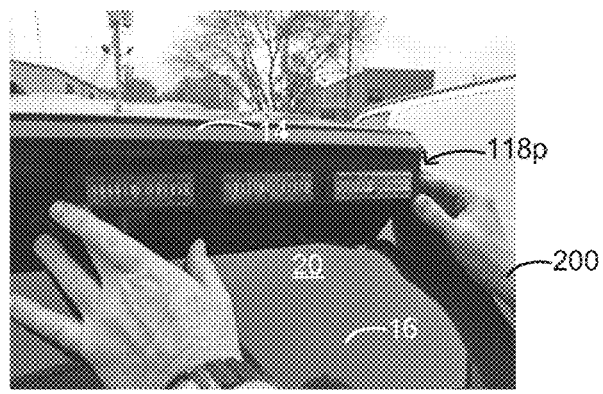
FIGS. 10-19 are a set of pictorial views showing an example installation steps for installing a light bar.
Figure 11:
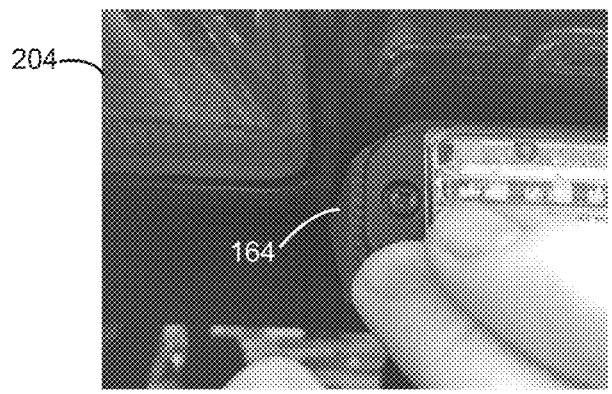

FIG. 9 is a pictorial view of wire bundles 178 extending from light heads 22 and lying on a bottom floor surface 182 in interior cavity 150 of light bar housing 118p. Each wire bundle 178 includes plural wires terminating in a connector that mates with an associated connector of an electrical wire harness 184. The mated connectors are securely stowed with pressure sensitive adhesive in interior cavity 150. Electrical wire harness 184 is routed through a notch 190 located at junction 162 of distal end portion 120*p* for connection to a main electrical wire harness residing in vehicle 10 to provide electrical signals to operate light heads 22.

FIGS. 10-19 are a set of pictorial views showing steps for installation of light bar housing 118*p* on, and its wiring harness connections to, a Ford Police Interceptor utility vehicle. Because the steps for installation of light bar housing 118*d* are similar to those of light bar housing 118*p*, for conciseness nearly duplicate steps are not separately described.

With liftgate 12 closed (FIG. 10), an installer 200 cleans outer glass surface 20 of window panel 16 with detergent and water. Also, installer 200 prepares an area of glass surface 20 that will confront light bar housing 118*p* by wiping the area down with isopropyl (rubbing) alcohol. The area is then coated with a tape primer that is allowed to dry thoroughly.

Figure 12:
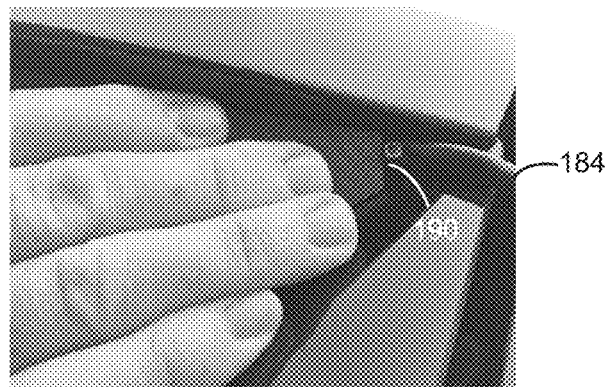

Once the tape primer dries, installer 200 removes an outer protective paper covering VHB tape 180 (FIG. 8). With tape adhesive exposed, installer 200 aligns (as described previously with reference to FIGS. 5A and 5B) curved distal end portions 120*p* and 120*d* with the curved surfaces of respective distal ends 122*p* and 122*d* of outer surface 20 of window panel 16 and secures housing 118*p* under spoiler 14 with junction 164 (FIG. 11) adjacent a center mounted stop light 204 of spoiler 14 by pressing the tape adhesive onto the tape primer. As shown in FIG. 12, installer 200 also ensures wire harness 184 remains located in its corresponding notch 190 while applying pressure to housing 118*p* for 10-15 seconds to ensure VHB tape 180 has achieved full adhesion to glass surface 20.

Figure 13:
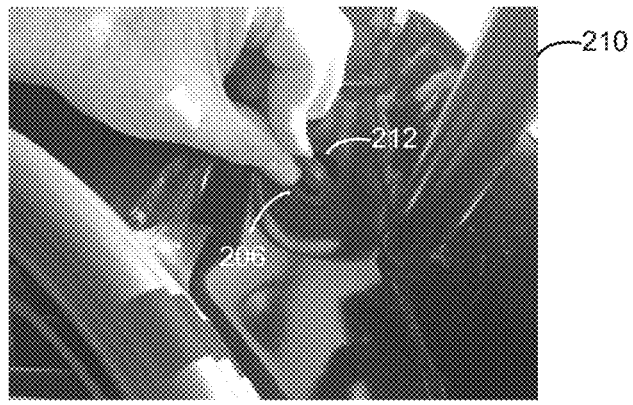
Figure 14:
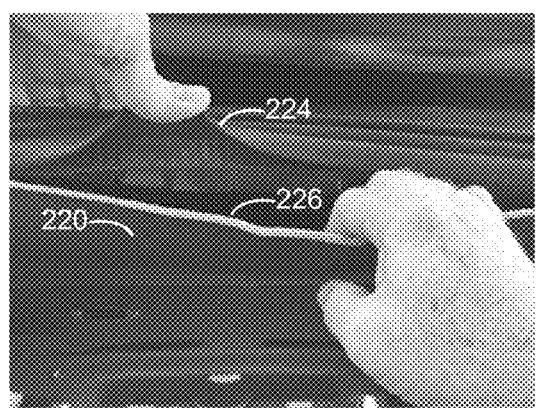

Next, liftgate 12 is raised and FIG. 13 shows installer 200 removes a passenger side grommet 206 located near a liftgate door support 210. Passenger side grommet 206 fills a wiring aperture 212 located in upper rear corners of a body of vehicle 10. Wire(s) passed through wiring aperture 212 will be extended under a headliner 220 (FIG. 14). Thus, FIG. 14 shows installer 200 pulling upward a liftgate water seal rubber extrusion 224 to expose a typically concealed edge 226 of headliner 220. Edge 226 is pulled downward to expose interior wiring space adjacent wiring aperture 212. This also exposes an electrical cable 230 (FIGS. 19 and 20) for powering light bar 118*p*. Installer 200 also loosens corner trim molding (not shown) to provide more access to a corner area above headliner 220.

Figure 16:
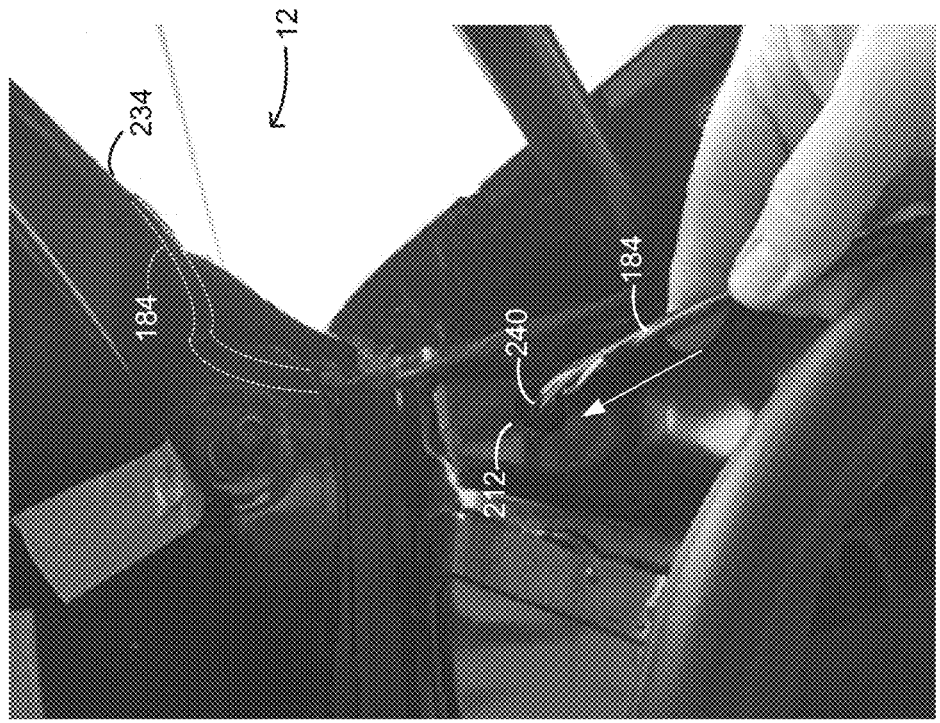
Figure 15:
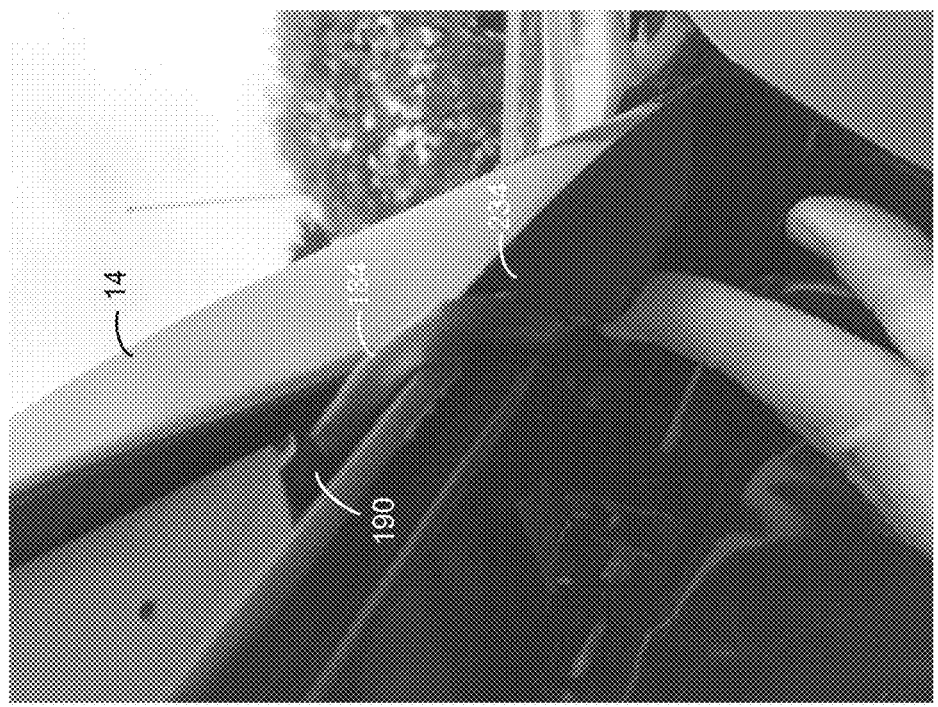

FIGS. 15 and 16 show how installer 220 routes harness 184 around a lateral edge 234 of spoiler 14 to feed a free end 240 of harness 184 through wiring aperture 212.

Figure 18:
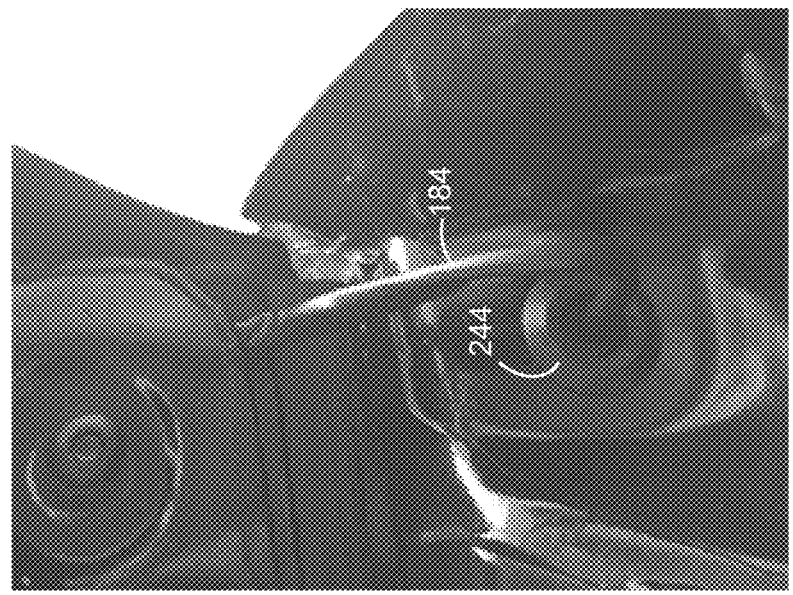
Figure 17:
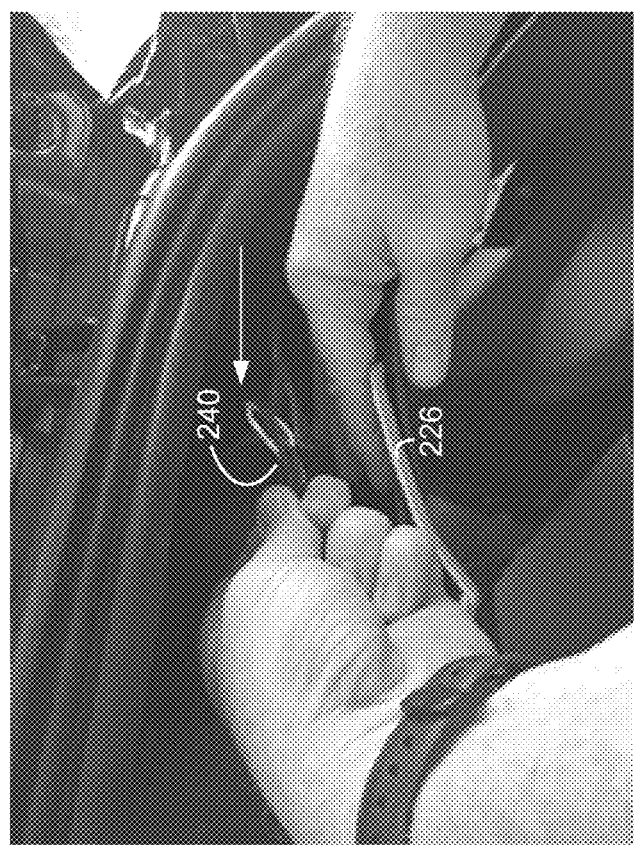
Figure 19:
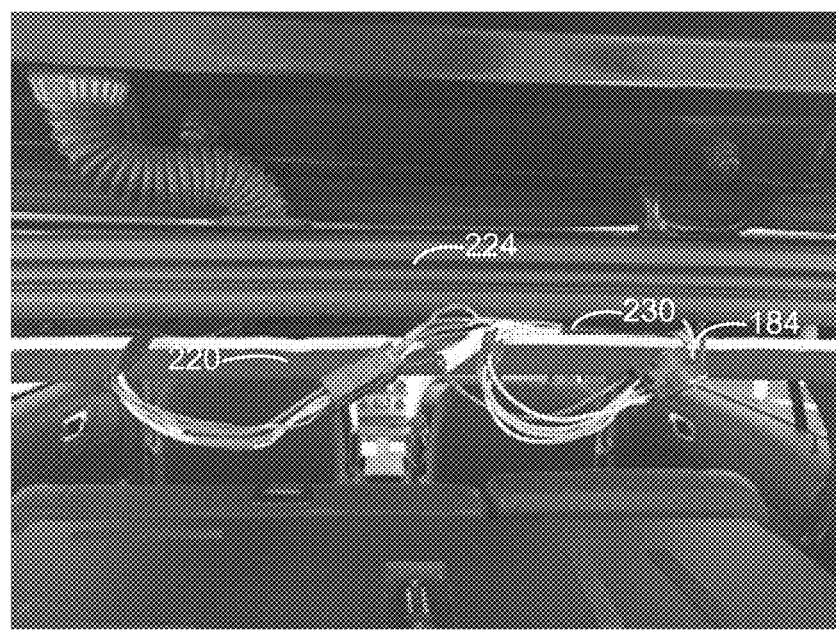

FIG. 17 shows installer 200 guiding free end 240 along edge 226 of headliner 220 to the aforementioned interior wiring space near cable 230 (FIG. 19). Sealer is applied to outer edges of a harness grommet 244 that FIG. 18 shows installed and sealing wiring aperture 212. Grommet 244 was previously threaded over harness 184 so that it could be slid down harness 184 and placed into wiring aperture 212.

FIG. 19 shows how harness 184 is then wired to cable 230 within the space made available by pulling headliner 200 down. Appropriate electrical connections are made and all the wires are tucked under and concealed by headliner 220. The connections may be tested by reconnecting a +12 v battery. Headliner 220 is pressed back up into position and retained by its retaining magnets contacting a roof of vehicle 10. Installer 200 pushes any lose corner trim molding back into position and reinstalls rubber extrusion gasket 224 back over edge 226 of headliner 220. Installer 200 closes liftgate 12 to check for any mechanical impingement that might be caused by the wiring, gaskets, or trim molding not being fully reinstalled.

Skilled persons will appreciate that many changes may be made to the details of the above-described embodiments without departing from the underlying principles of the invention. In a first example, the light bar housings can be joined by an interconnecting piece bonded to the window panel surface or can be formed as a single unitary housing. In a second example, the liftgate can be part of a vehicle other than a utility vehicle. The scope of the present invention should, therefore, be determined only by the following claims.

The invention claimed is:

1. For a vehicle having a roof with a rear end at which a liftgate and rear spoiler are installed, the liftgate including a top side margin and a window panel with a glass outer surface having first and second curved distal ends, and the rear spoiler factory-installed at the top side margin and at the rear end by mounting components establishing a liftgate spoiler sealing system, a method of installing an exterior-mounted light bar accessory underneath the rear spoiler and onto the glass outer surface while leaving intact the rear spoiler and the liftgate spoiler sealing system, the method comprising:

obtaining a light bar housing for installation underneath the rear spoiler and against the glass outer surface of the liftgate, the light bar housing configured for attachment of multiple light heads and including a liftgate mounting surface and a light head mounting surface, the liftgate mounting surface of the light bar housing having a curved distal end portion of complementary shape to a curved outer surface at one of the first and second curved distal ends of the glass outer surface of the liftgate;

positioning the light bar housing underneath the rear spoiler and against the glass outer surface of the liftgate, the liftgate mounting surface of the light bar housing set in alignment with one of the first and second curved distal ends of the glass outer surface of the liftgate; and using bonding material to securely mount the light bar housing, while set in its alignment position, to the glass outer surface of the liftgate, thereby leaving intact the factory-installed rear spoiler and without compromising the integrity of the sealing system throughout the installation of the light bar housing.

2. The method of claim 1, in which the bonding material includes very high bond tape.

3. The method of claim 1, in which the light head mounting surface of the light bar housing includes a straight section and an angled section, and when the light bar housing is securely mounted to the glass outer surface of the liftgate, the straight section faces rearward of the glass outer surface of the liftgate and the angled section faces sideward at a corresponding one of the first and second curved distal ends of the glass outer surface of the liftgate.

4. The method of claim 3, in which at least two light heads are mounted to the straight section and a single light head is mounted to the angled section of the light head mounting surface.

5. The method of claim 1, in which, for the light bar housing, the liftgate mounting surface is the surface of a bowed wall having first and second ends, and in which the light head mounting surface is the surface of a two-section wall that includes a straight section having a first end and an angled section having a second end, the first ends of the bowed wall and the straight section being joined and the second ends of the bowed wall and the angled section being joined to form an interior cavity that encompasses electrical wires extending from the multiple light heads when they are attached to the light head mounting surface.

6. The method of claim 1, in which, for the light bar housing, the liftgate mounting surface is the surface of a bowed wall having first and second ends, and in which the light head mounting surface is the surface of a two-section wall that includes a straight section having a first end and an angled section having a second end, the first ends of the bowed wall and the straight section being joined and the second ends of the bowed wall and the angled section being joined to form an interior cavity, and in which plural wires extend from each of the multiple light heads and terminate in a different one of a set of first electrical connectors, and further comprising for the light bar housing:

attaching the multiple light heads to the light head mounting surface and laying in the interior cavity the plural wires extending from each of the multiple light heads;

positioning one end of an electrical wire harness in the interior cavity, the electrical wire harness including, for each of the multiple light heads, a bundle of wires terminating in a set of second electrical connectors that are matable to corresponding ones of the set of first electrical connectors;

connecting together corresponding pairs of the first and second matable electrical connectors and stowing them in the interior cavity; and passing the electrical harness through an opening at or proximal to a location where the second ends of the bowed wall and the angled section are joined, so that the electrical wire harness can be routed within the vehicle for electrical connection of the other end of the electrical wire harness to a main electrical wire harness that provides electrical signals to operate the multiple light heads.

7. For a vehicle having a roof with a rear end at which a liftgate and rear spoiler are installed, the liftgate including a top side margin and a window panel with a glass outer surface having first and second curved distal ends, and the rear spoiler factory-installed at the top side margin and at the rear end by mounting components establishing a liftgate spoiler sealing system, a method of installing an exterior-mounted light bar accessory underneath the rear spoiler and onto the glass outer surface while leaving intact the rear spoiler and the liftgate spoiler sealing system, the method comprising:

obtaining first and second light bar housings for installation underneath the rear spoiler and against the glass outer surface of the liftgate, each of the first and second light bar housings configured for attachment of multiple light heads and including a liftgate mounting surface and a light head mounting surface, the liftgate mounting surfaces of the first and second light bar housings having curved distal end portions of complementary shapes to curved surfaces of the respective first and second distal ends of the glass outer surface of the liftgate;

positioning each of the first and second light bar housings underneath the rear spoiler and against the glass outer surface of the liftgate, the liftgate mounting surfaces of the first and second light bar housings set in alignment with the respective first and second curved distal ends of the glass outer surface of the liftgate; and using bonding material to securely mount the first and second light bar housings, while set in their alignment positions, to the glass outer surface of the liftgate, thereby leaving intact the factory-installed rear spoiler without compromising the integrity of the sealing system throughout the installation of the first and second light bar housings.

8. The method of claim 7, in which the bonding material includes very high bond tape.

9. The method of claim 7, in which the light head mounting surface of each of the first and second light bar housings includes a straight section and an angled section, and when the first and second light bar housings are securely mounted to the glass outer surface of the liftgate, the straight section faces rearward of the glass outer surface of the liftgate and the angled section faces sideward at a corresponding one of the first and second curved distal ends of the glass outer surface of the liftgate.

10. The method of claim 9, in which at least two light heads are mounted to the straight section and a single light head is mounted to the angled section of the light head mounting surface.

11. The method of claim 7, in which, for each of the first and second light bar housings, the liftgate mounting surface is the surface of a bowed wall having first and second ends, and in which the light head mounting surface is the surface of a two-section wall that includes a straight section having a first end and an angled section having a second end, the first ends of the bowed wall and the straight section being joined and the second ends of the bowed wall and the angled section being joined to form an interior cavity that encompasses electrical wires extending from the multiple light heads when they are attached to the light head mounting surface.

12. The method of claim 7, in which, for each of the first and second light bar housings, the liftgate mounting surface is the surface of a bowed wall having first and second ends, and in which the light head mounting surface is the surface of a two-section wall that includes a straight section having a first end and an angled section having a second end, the first ends of the bowed wall and the straight section being joined and the second ends of the bowed wall and the angled section being joined to form an interior cavity, and in which plural wires extend from each of the multiple light heads and terminate in a different one of a set of first electrical connectors, and further comprising for each of the first and second light bar housings:

attaching the multiple light heads to the light head mounting surface and laying in the interior cavity the plural wires extending from each of the multiple light heads;

positioning one end of an electrical wire harness in the interior cavity, the electrical wire harness including, for each of the multiple light heads, a bundle of wires terminating in a set of second electrical connectors that are matable to corresponding ones of the set of first electrical connectors;

connecting together corresponding pairs of the first and second matable electrical connectors and stowing them in the interior cavity; and passing the electrical harness through an opening at or proximal to a location where the second ends of the bowed wall and the angled section are joined, so that the electrical wire harness can be routed within the vehicle for electrical connection of the other end of the electrical wire harness to a main electrical wire harness that provides electrical signals to operate the multiple light heads.

* * * * *